United States Patent
Lazaridis et al.

(10) Patent No.: US 8,565,740 B2
(45) Date of Patent: Oct. 22, 2013

(54) SYSTEM AND METHOD FOR PROVIDING STREAMING DATA TO A MOBILE DEVICE

(75) Inventors: Mihal Lazaridis, Waterloo (CA); Gary Phillip Mousseau, Waterloo (CA)

(73) Assignee: BlackBerry Limited (CA)

( * ) Notice: Subject to any disclaimer, the term of this patent is extended or adjusted under 35 U.S.C. 154(b) by 1082 days.

(21) Appl. No.: 12/117,261

(22) Filed: May 8, 2008

(65) Prior Publication Data

US 2009/0280784 A1    Nov. 12, 2009

(51) Int. Cl.
*H04L 29/08*    (2006.01)

(52) U.S. Cl.
USPC ............ 455/414.4; 455/414.1; 455/414.3

(58) Field of Classification Search
USPC ............ 455/414.1–414.4, 454; 370/389, 429; 709/229; 375/299
See application file for complete search history.

(56) References Cited

U.S. PATENT DOCUMENTS

| | | | | |
|---|---|---|---|---|
| 5,991,306 | A * | 11/1999 | Burns et al. ................... | 370/429 |
| 7,076,244 | B2 | 7/2006 | Lazaridis et al. | |
| 2001/0051996 | A1 * | 12/2001 | Cooper et al. ................. | 709/217 |
| 2002/0016736 | A1 * | 2/2002 | Cannon et al. ................. | 705/14 |
| 2003/0026231 | A1 * | 2/2003 | Lazaridis et al. .............. | 370/338 |
| 2003/0177250 | A1 * | 9/2003 | Oliver et al. .................. | 709/229 |
| 2004/0071088 | A1 * | 4/2004 | Curcio et al. ................. | 370/235 |
| 2005/0105561 | A1 * | 5/2005 | Kim ............................. | 370/503 |
| 2005/0223107 | A1 * | 10/2005 | Mine et al. .................... | 709/231 |
| 2006/0168289 | A1 * | 7/2006 | Wang et al. .................... | 709/231 |
| 2006/0217126 | A1 * | 9/2006 | Sohm et al. .................... | 455/454 |
| 2006/0234684 | A1 * | 10/2006 | Shin ............................ | 455/414.1 |
| 2007/0094691 | A1 * | 4/2007 | Gazdzinski .................... | 725/62 |
| 2007/0171903 | A1 * | 7/2007 | Zeng et al. .................... | 370/389 |
| 2008/0021730 | A1 * | 1/2008 | Holla et al. ................... | 705/2 |
| 2008/0021834 | A1 * | 1/2008 | Holla et al. ................... | 705/51 |
| 2008/0072159 | A1 * | 3/2008 | Cockerton ..................... | 715/756 |
| 2009/0041155 | A1 * | 2/2009 | Sugai et al. .................... | 375/299 |

FOREIGN PATENT DOCUMENTS

| | | |
|---|---|---|
| GB | 2440581 A | 4/2008 |
| WO | WO-2006126260 A1 | 11/2006 |

OTHER PUBLICATIONS

European Search Report dated Nov. 5, 2008, Europan Patent Application No. 08155930.4.
Canadian Office Action dated Jan. 24, 2011, Canadian Patent Application No. 2,664,887.
"Canadian Application Serial No. 2,664,887, Office Action mailed Sep. 18, 2012", 2 pgs.
"Canadian Application Serial No. 2,664,887, Office Action mailed Dec. 12, 2011", 3 pgs.
"Canadian Application Serial No. 2,664,887, Response filed Mar. 29, 2011 to Office Action mailed Mar. 29, 2012", 17 pgs.
"European Application Serial No. 08155930.4, European Search Report mailed Nov. 8, 2008", 7 pgs.
"European Application Serial No. 08155930.4, Response filed Aug. 20, 2009 to European Search Report mailed Nov. 5, 2008", 6 pgs.

* cited by examiner

*Primary Examiner* — Jinsong Hu
*Assistant Examiner* — Nathan Taylor
(74) *Attorney, Agent, or Firm* — Schwegman Lundberg & Woessner, P.A.

(57) ABSTRACT

Various embodiments for a system and method for providing streaming data to a device are provided herein. In one example, a method comprises receiving a request for streaming data from a mobile device, receiving settings with regards to the delivery of the streaming data to the mobile device, retrieving the streaming data from a source of the streaming data, reformatting the streaming data for the mobile device according to the settings and sending the reformatted streaming data to the mobile device in accordance with the settings.

21 Claims, 8 Drawing Sheets

SYSTEM AND METHOD FOR PROVIDING STREAMING DATA TO A MOBILE DEVICE

FIELD

This application relates generally to a system and method for providing streaming data to a mobile device, and more specifically to a system and method for retrieving, reformatting and pushing streaming data to a mobile device based on settings that allow for more efficient and inexpensive transmission to the mobile device.

BACKGROUND

As mobile devices become more and more popular, the range and scope of the content that is being delivered to mobile devices is rapidly increasing. Initial applications included the transmission of voice and data to mobile devices, although the data was generally restricted to text data. More recently, it has become more popular to also send larger quantities of data including music files, and even more recently images or video files to mobile devices or among mobile devices. For example, mobile devices are now being used more and more to browse the internet, send still images, and send or view moving images, including portions of or full television programs or movies and the like.

The delivery of these more intensive types of data is typically achieved by one of two methods. The first method is streaming data, audio or video, in which the streaming data is sent to/retrieved by the mobile device in "real-time" and the audio or video file is played on the mobile device as it is received and without storage of the streaming data as a whole. In some cases, the played portions of the audio or video stream may also be erased immediately after being played. The second method is the delivery of the content in a complete file that can later be played and replayed by the end user. This method is sometimes referred to as "pod casting".

Streaming data has a drawback in that the mobile device user must watch the streaming data immediately upon selecting the streaming data on the phone. Both streaming data and podcast formats generally do not give the user the option to customize the format of the data set sent (such as audio only, video only, or the like). In a similar vein, both streaming data and podcast formats generally rely on a player designed for a particular format of streaming data or podcast. This can be particularly difficult if the user wishes to view data that has been saved in different formats and may require different reader software. This results in a burden on the memory in the mobile device, which reduces mobile device performance.

BRIEF DESCRIPTION OF THE DRAWINGS

For a better understanding of the example embodiments herein, and to show more clearly how they may be carried into effect, reference will now be made, by way of example, to the accompanying drawings in which.

DETAILED DESCRIPTION

This detailed description begins with a general description of the mobile environment and then proceeds to describe the application of example embodiments within this environment with regards to streaming data to a mobile device.

The mobile environment involves use of a mobile communication device. A mobile communication device is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
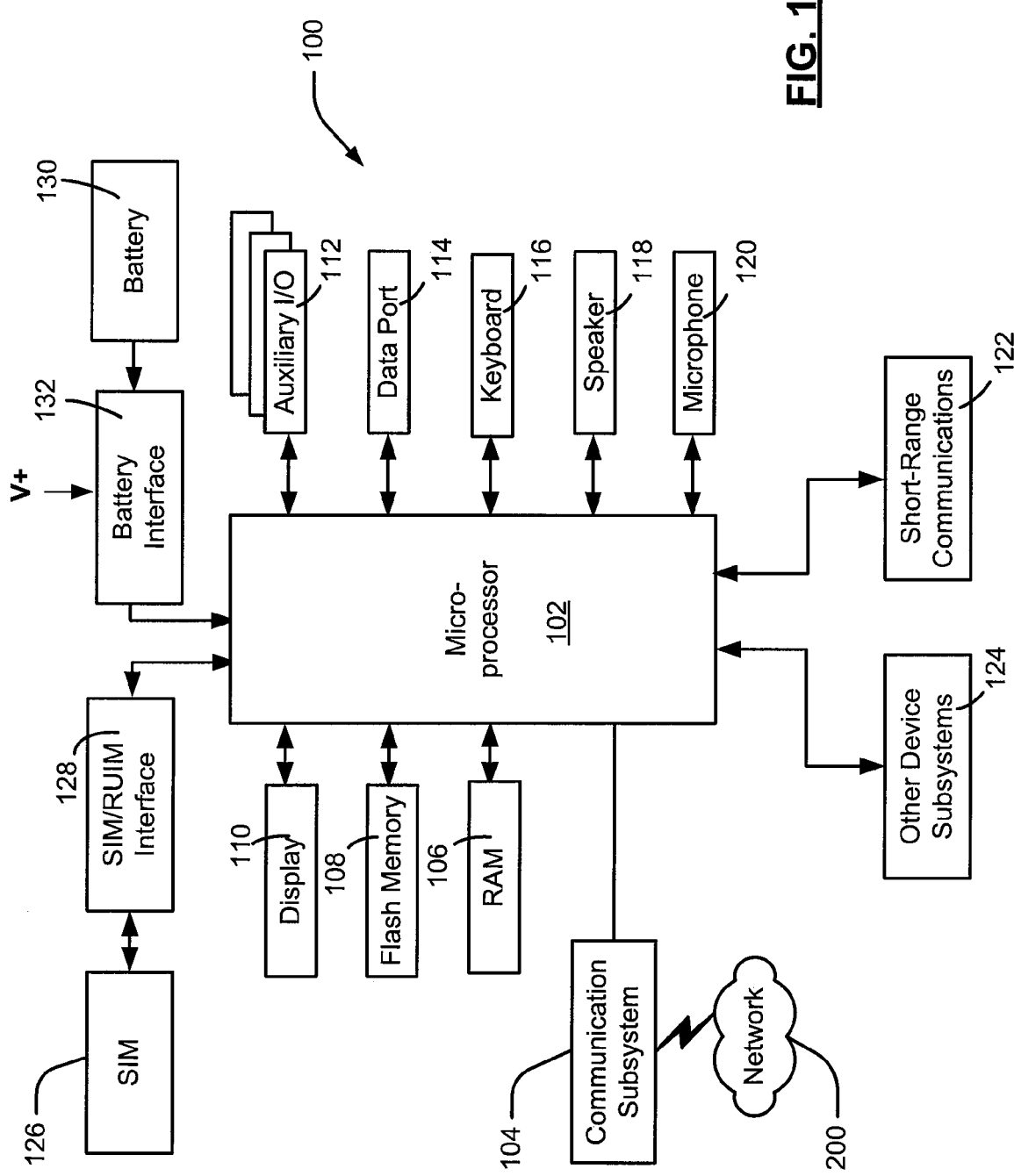
FIG. 1 is a block diagram of a mobile device in one example implementation.
Figure 2:
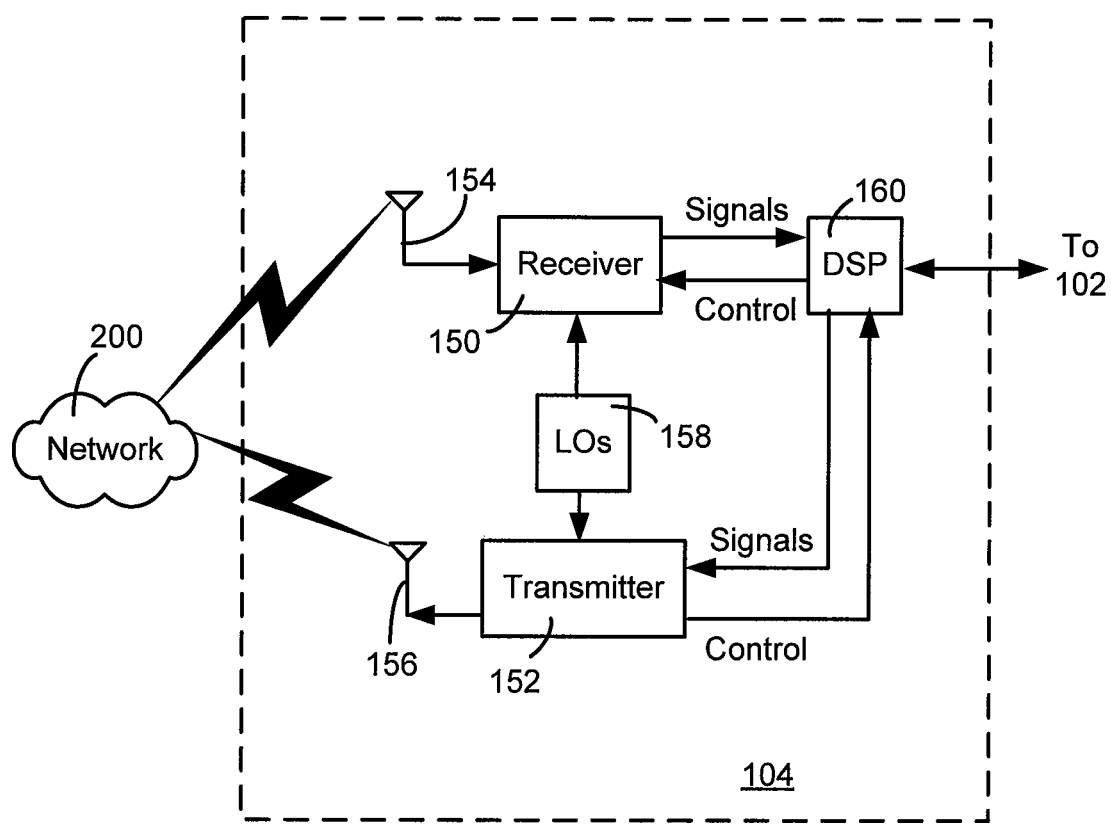
FIG. 2 is a block diagram of a communication subsystem component of the mobile device of FIG. 1.
Figure 3:
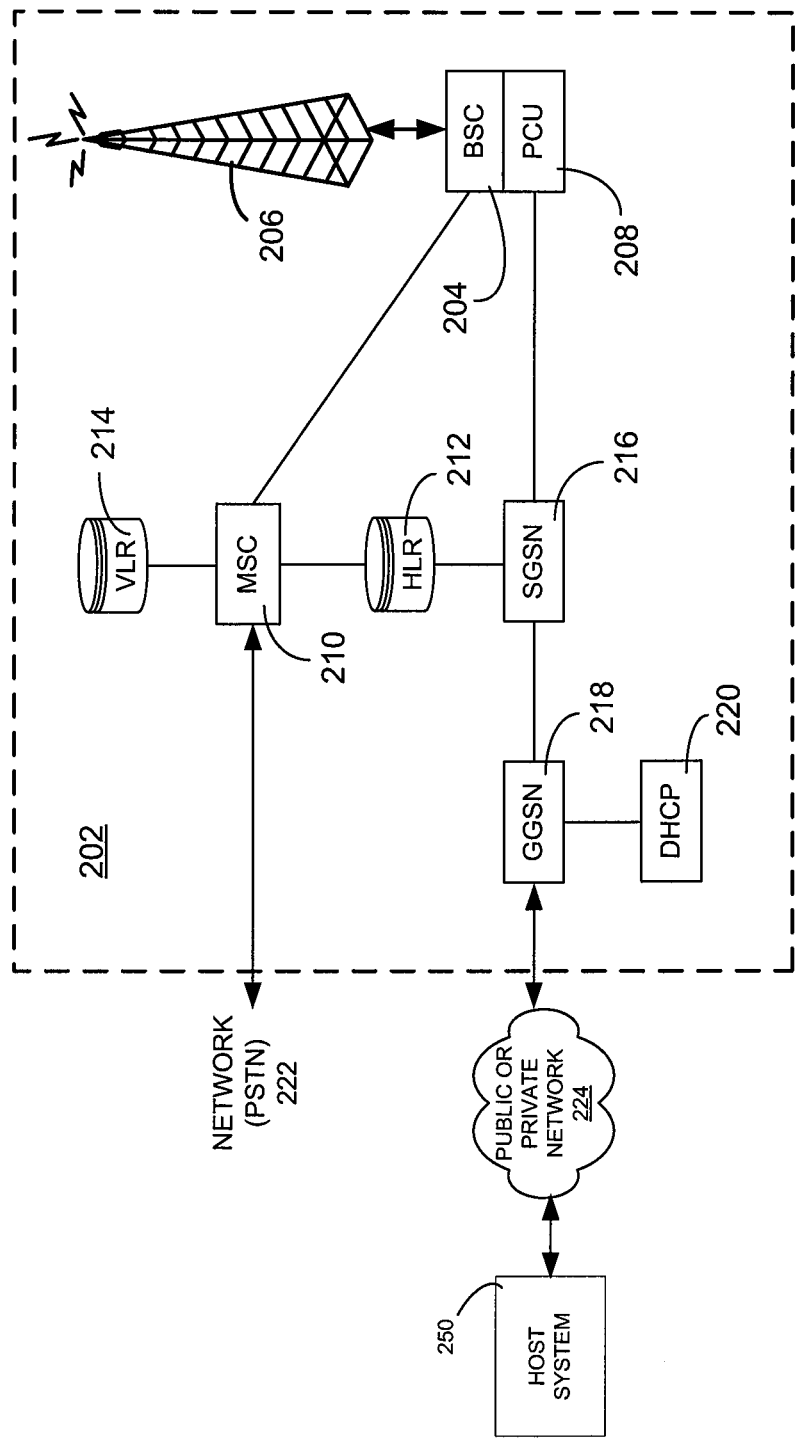
FIG. 3 is a block diagram of a node of a wireless network in one example implementation.

To aid the reader in understanding the structure of a mobile device and how it communicates with other devices, reference is made to FIGS. 1 through 3.

Referring first to FIG. 1, a block diagram of a mobile device in one example implementation is shown generally as mobile device 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that any other suitable standards can be used that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, data port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may require a SIM/RUIM card 126 (i.e. Subscriber Identity Module or Removable User Identity Module) to be inserted into a SIM/RUIM interface 128 in order to communicate with a network. SIM card or RUIM 126 is one type of a conventional "smart card" used to identify a subscriber of mobile device 100 and to personalize the mobile device 100, among other things. Without SIM card/RUIM 126, mobile device 100 is not fully operational for communication with network 200. By inserting SIM card/RUIM 126 into SIM/RUIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM card/RUIM 126 includes a processor and memory for storing information. Once SIM card/RUIM 126 is inserted into SIM/RUIM interface 128, it is coupled to microprocessor 102. In order to identify the subscriber, SIM card/RUIM 126 contains some user parameters such as an International Mobile Subscriber Identity (IMSI). An advantage of using SIM card/RUIM 126 is that a subscriber is not necessarily bound by any single physical mobile device. SIM card/RUIM 126 may store additional subscriber information for a mobile device as well, including datebook (or calendar) information and recent call information. Alternatively, user identification information can also be programmed into flash memory 108.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, data port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Data port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication. Data port 114 can be any suitable port that enables data communication between mobile device 100 and another computing device. Data port 114 can be a serial or a parallel port. In some instances, data port 114 can be a USB port that includes data lines for data transfer and a supply line that can provide a charging current to charge mobile device 100.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. An RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 5210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile device 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile device 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
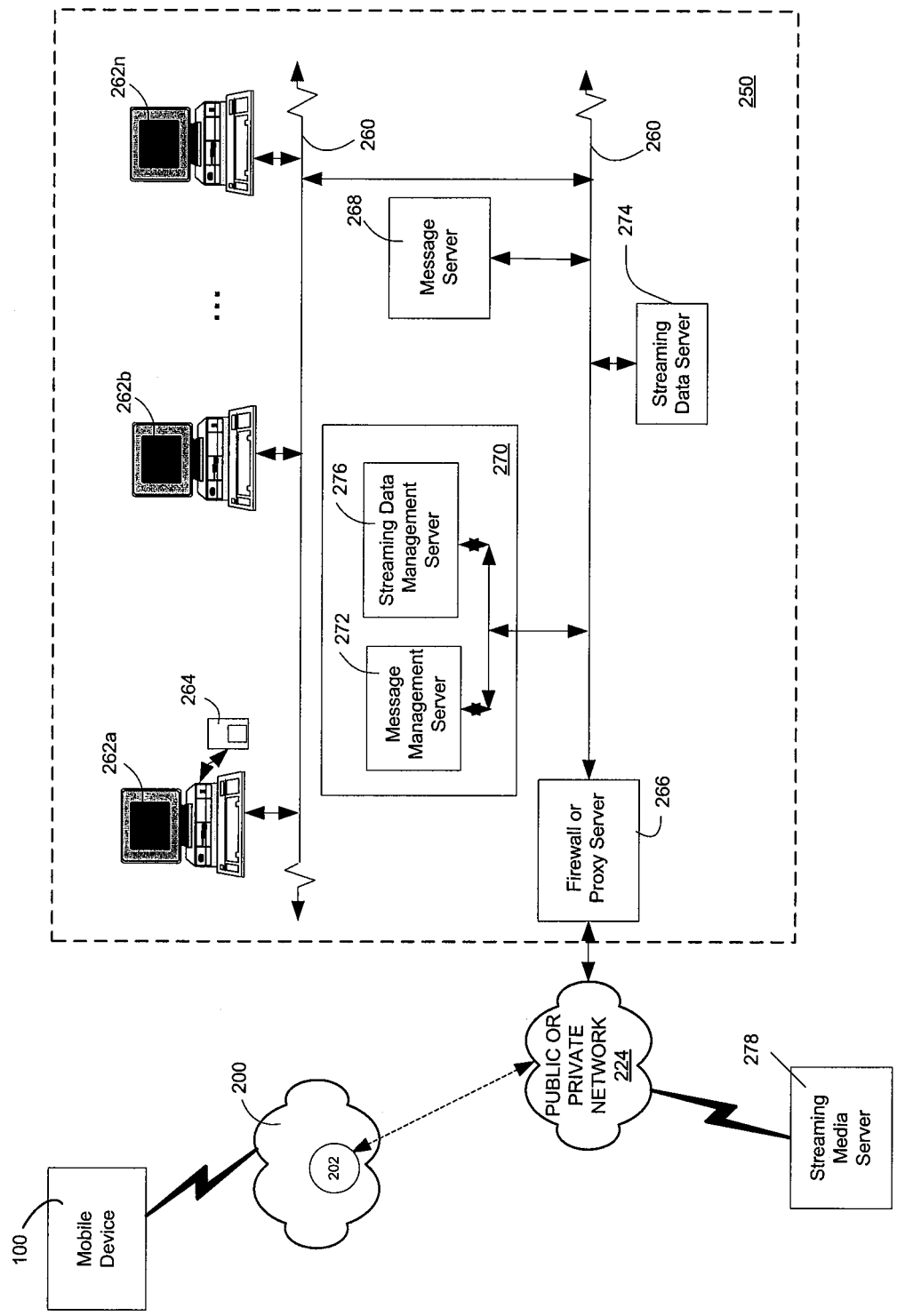
FIG. 4 is a block diagram illustrating components of a host system in one example implementation.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

Host system 250 comprises a number of network components connected to each other by LAN connections 260. For instance, a user's desktop computer 262a with an accompanying cradle 264 for the user's mobile device 100 is situated on the LAN. Cradle 264 for mobile device 100 may be coupled to computer 262a by a serial or a Universal Serial Bus (USB) connection, for example. Other user computers 262b are also situated on the LAN, and each may or may not be equipped with an accompanying cradle 264 for a mobile device. Cradle 264 facilitates the loading of information (e.g. PIM data, private symmetric encryption keys to facilitate secure communications between mobile device 100 and host system 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically also be connected to other peripheral devices not explicitly shown in FIG. 4.

Furthermore, only a subset of network components of host system 250 are shown in FIG. 4 for ease of exposition, and it will be understood by persons skilled in the art that host system 250 will generally comprise additional components not explicitly shown in FIG. 4, for this example configuration. More generally, host system 250 may represent a smaller part of a larger network (not shown) of the organization, and may comprise different components and/or be arranged in different topologies than that shown in the example of FIG. 4.

In this example, mobile device 100 communicates with host system 250 through a node 202 of wireless network 200 and a shared network infrastructure 224 such as a service provider network or the public Internet. Access to host system 250 may be provided through one or more routers (not shown), and computing devices of host system 250 may operate from behind a firewall or proxy server 266.

In a variant implementation, host system 250 comprises a wireless VPN router (not shown) to facilitate data exchange between host system 250 and mobile device 100. The concept of a wireless VPN router implies that a VPN connection can be established directly through a specific wireless network to mobile device 100. The wireless VPN router can be used based on Internet Protocol (IP) Version 6 (IPV6) used in IP-based wireless networks. This IPV6 protocol provides enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by message server 268 of host system 250. Such messages may originate from any of a number of sources. For instance, a message may have been sent by a sender from a computer 262b within host system 250, from a different mobile device (not shown) connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of message server 268 is a Microsoft Exchange™ Server. In some implementations, host system 250 may comprise multiple message servers 268. Message server 268 may also be adapted to provide additional functions beyond message management, including the management of data associated with calendars and task lists, for example.

When messages are received by message server 268, they are typically stored in a message store (not explicitly shown), from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of host system 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES), Triple DES or Advanced Encryption Standard (AES)) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in host system 250 or another network. For example, some or all of the functions associated with message management server 272 may be integrated with message server 268, or some other server in host system 250. Furthermore, host system 250 may comprise multiple message management servers 272, particularly in variant implementations where a large number of mobile devices need to be supported.

While message server 268 and message management server 272 handle message related traffic, a streaming data server 274 and a streaming data management server 276 handle streaming data traffic that may be requested by a user of the mobile device 100 via host system 250 and/or the public or private networks 224. It should be understood that the servers include a communication interface that allows the server to communicate with a network, a data store and a processor that is coupled to the communication interface and the data store to control the operation of the server. The streaming data server 274 and streaming data management server 276 together provide an application called a streaming data service that is used to specifically provide support for the accessing of streaming data that is to be delivered to mobile device 100. The term "streaming data service" may sometimes be used interchangeably to represent the functions provided by the combination of streaming data server 274 and streaming data management server 276. The term "streaming data" refers to data (or content) that is intended to be sent from a computer (usually a server) using a system in which the data is to be accessed by a user as it is received in "real-time" and a user can begin accessing the data in advance of receipt of all of the data related to that streaming data. Streaming data often relates to video or audio content that is divided into "shows" such as movies, TV or radio shows but may also include continuous feed of radio programming or the like. In this latter case, the systems and methods herein may be configured to select a segment or portion of a continuous feed as the streaming data. In some cases involving conventional streaming data, the streaming data is configured such that a user is not able to save the streaming data for later use.

The streaming data management server 276 provides control and support for the provision of streaming data from streaming data server 274 to mobile device 100 in accordance with settings provided by a user of mobile device 100. It will be understood that the user settings may be provided as configuration settings that apply to all streaming data or may be provided at the time of requesting the streaming data or may be a combination of both types of settings.

In operation, streaming data server 274 communicates with one or more streaming media servers (such as streaming media server 278, which is connected to public or private network 224) to gather streaming data and provide it for distribution to mobile device 100 in co-ordination with streaming data management server 276.

The streaming data service is configured to first access the streaming data, reformat and save the data to a streaming data file, which can then be pushed to mobile device 100 in accordance with user settings. Preferably, users of mobile device 100 have the option to customize the streaming data that is to be received at mobile device 100 to suit their needs. For example, subscribers can specify a format of the streaming data, including, for example, choosing audio only or video only or the like. A user may also choose or set the maximum number or length of streaming data files delivered to their mobile device 100. Further, a user may choose or set variables such as the time or location that the one or more streaming data files are to be sent to their mobile device 100.

In particular, the streaming data service may allow a user to select streaming data for later download by scheduling the streaming data download at, for example, an off-peak time in which rates are cheaper for sending data to mobile device 100 or during times when mobile device 100 or the network that it is connected to is less likely to be used.

Once mobile device 100 receives a new streaming data file pushed from the streaming data service, mobile device 100 may display a visual notification to alert the user that a new streaming data file has arrived.

As is noted above with regard to the message management server 272, streaming data management server 276 may also provide encryption for the data processed by streaming data management server 276.

With the above general embodiment in mind, the following description relates to a more detailed embodiment.

Figure 5:
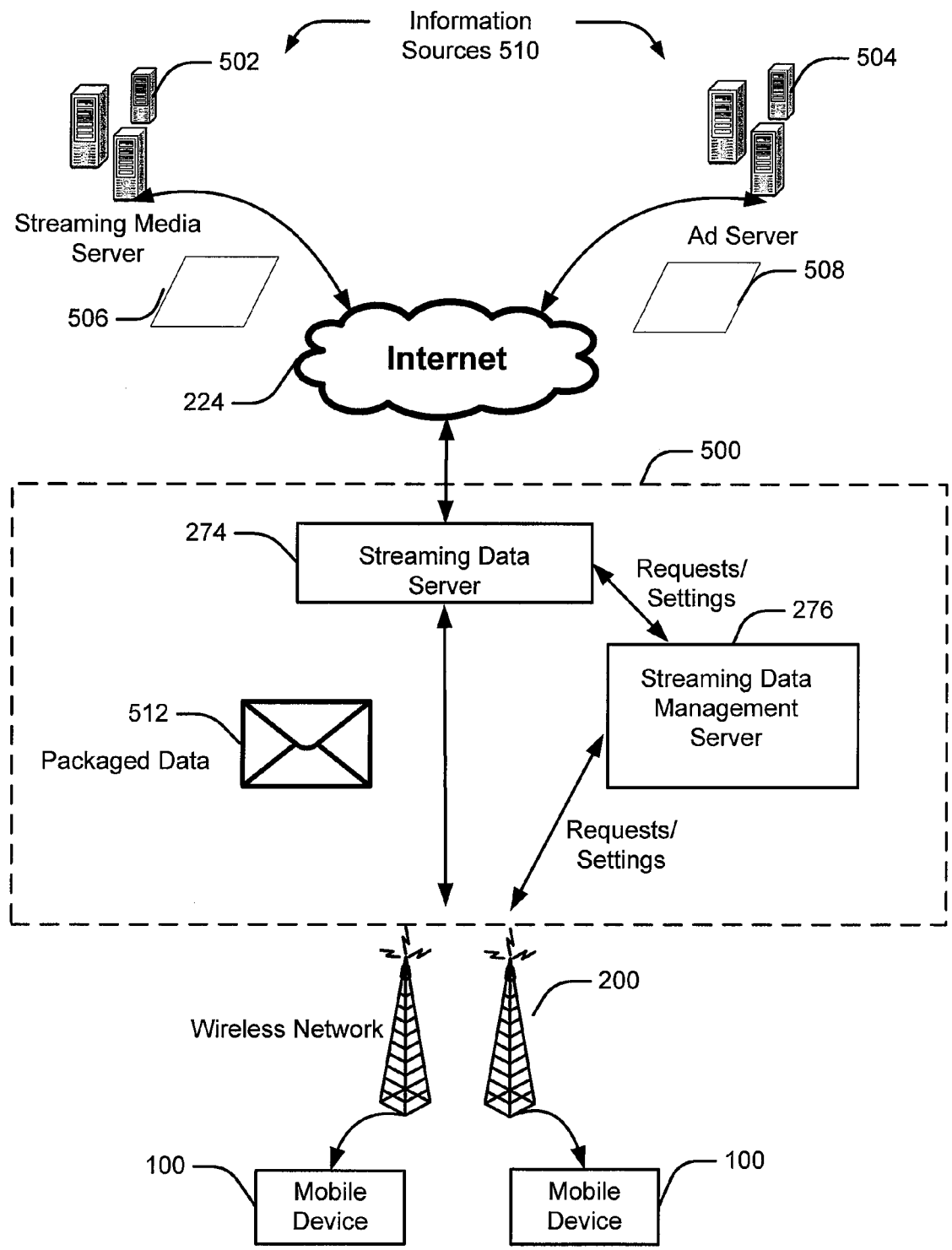
FIG. 5 is a block diagram illustrating components of a system for providing streaming data to a mobile device and its operating environment.

FIG. 5 shows a block diagram of an example embodiment of a system 500 for providing streaming data to mobile device 100. The illustrated system 500 includes the streaming data server 274, and the streaming data management server 276. Also illustrated in FIG. 5 is the public or private network 224, which can be the Internet for example, that links the streaming data server 274 to information sources 510 including, for example, streaming media server 502 and ad server 504. FIG. 5 also shows wireless network 200 that links streaming data server 274 and mobile device 100. The embodiment shown in FIG. 4 can be adapted to operate in a similar fashion as system 500.

Information sources 510 may, for example, be a series of computers or databases on a local area network (LAN) available through a computer network, such as the Internet 224. Information sources 510 can include more than one streaming media server 276 and more that one advertising (ad) server 502. Streaming media server 502 provides streaming data 506 to streaming data server 274. Streaming media server 502 may provide music, video, voice and the like as streaming data 506, for example. Ad server 504 provides advertising data 508, which may comprise additional or complementary information that may be related to the streaming data 506 or that may be provided separately. Advertising data 508 may include coupon deals, timed sales events, brand recognition ads, company ads, testimonials, product placement ads and other advertising. For example, in some cases, streaming media server 502 and ad server 504 may be Internet or Intranet servers that include aggregated Internet or Intranet content.

Streaming data server 274 may, for example, be a wireless proxy server that functions as a gateway between public or private network 224 and wireless network 200. Streaming data server 274 accesses streaming data 506 from one or more Information sources 510 and saves it locally in a predetermined format. The actual format will generally depend on the type of data but may be, for example, a proprietary format, mp3, mpeg, windows media, etc. Streaming data server 274 may also provide a method of combining streaming data 506 with advertising data 508.

Streaming data management server 276 is configured to receive instructions and settings from mobile device 100. These instructions and settings typically include a request for streaming data 506, along with at least one of: a setting regarding how the streaming data 506 is to be delivered, a setting regarding the time and/or location when the streaming data 506 is to be delivered, a setting regarding the maximum amount of data to be delivered, a setting regarding the format of the streaming data 506 to be delivered, and other similar types of settings. Streaming data management server 276 may also receive mobile device information in relation to the status of mobile device 100 such as, for example, the geographic position of mobile device 100, the available memory capacity of mobile device 100, the status of mobile device 100 regarding being in use for communications or not, and other similar information that may be available from mobile device 100. Based on this received information, streaming data management server 276 instructs streaming data server 274 to access streaming 506 data from the information sources 510. Streaming data management server 276 further provides instructions to streaming data server 274 with regard to the formatting of the streaming data 506 for creating the packaged data 512, the time of delivery of the streaming data 506 or the location and delivery of the streaming data 506, such that streaming data server 274 sends packaged data 512 to mobile device 100 in an appropriate format and at the appropriate time and/or location.

In some embodiments, streaming data server 274 may need to provide streaming media server 502 or ad server 504 with password information to authenticate that the owner of streaming data server 274 is authorized to save the streaming media in an alternative format. This type of authentication system may be necessary in dealing with streaming media server 502 when it is configured to prevent the saving of streaming data 506 by end users that are not authorized to do so, that is, users that are only authorized to view but not save the streaming data 506.

The "push" paradigm employed by streaming data server 274 and streaming data management server 276 continuously formats, reformats or packages streaming data 506 and advertising data 508 for transmission over wireless network 200 as packaged data 512. As an example, in some cases, meta-tags may be embedded into streaming data 506 as control sequences to indicate when advertising data 508 can be inserted. Streaming data server 274 may also automatically combine streaming data 506 and advertising data 508 into the packaged data 512 based on each user's preference. Streaming data server 274 then transmits or pushes the packaged data 512 over wireless network 200 to mobile device 100 based on user settings as controlled by streaming data management server 276. In some cases, streaming data management server 276 may control streaming data server 274 to, for example, either poll information sources 510 for updated data 506 and/or 508 or receive updated data 506 and/or 508 that is automatically transmitted or pushed from information sources 510.

The combining of streaming data 506 and advertising data 508 into packaged data 512 may be achieved in several ways based on the implementation of streaming data server 274 and based on user preferences/settings. One possible goal of combining information with advertising content is to achieve a revenue source for the provider of the information so the mobile device user gets a reduced or free information service.

In order to facilitate the transmission of streaming data 506 from an information source 510 to mobile device 100 via streaming data server 274, streaming data management server 276 manages various settings related to the mobile device user. The settings may include, for example, the format of the data to be extracted from a given type of streaming data, the amount of data to be sent, and other variables. Based on the settings received from streaming data management server 276, streaming data 506 can be retrieved, reformatted and arranged at streaming data server 274 with no direct involvement from Information source 502. For advertising content 508, the collection and configuration procedures may be performed similarly.

Some examples of the type of settings that may be stored at streaming data management server 276 are mobile device location information, accounting information, time or time range information for sending packaged data 512, location or location range information for sending packaged data 512, number of files on mobile device 100, memory size of mobile device 100, or other relevant information. Streaming data server 274 will be work in co-operation with streaming data management server 276 before transmitting information to mobile device 100 in order to determine if the information should be transmitted.

In some cases, streaming data server 274 may store received streaming data 506 and/or advertising content 508 to a plurality of channels (not shown) based on, for example, user specific information categories. Streaming data management server 276 provides the user of mobile device 100 with the ability to control packaged data 512 that is sent from streaming data server 274 to mobile device 100. A mobile device user can control when packaged data 512 will be sent to mobile device 100 by, for example, setting streaming data management server 276 to only send packaged data 512 at a convenient time. In another example, a mobile device user may be able to control how packaged data 512 is sent to mobile device 100 based on the geographical location of mobile device 100, based on certain triggering events, or based on some other predetermined criteria.

In order to control how packaged data 512 is provided from streaming data server 274, mobile device 100 may transmit information to streaming data management server 276 that provides the streaming data management server 276 with values for settings or the like, such as the device's geographical location, the time of day, a user request, or some other type of information.

Figure 6:
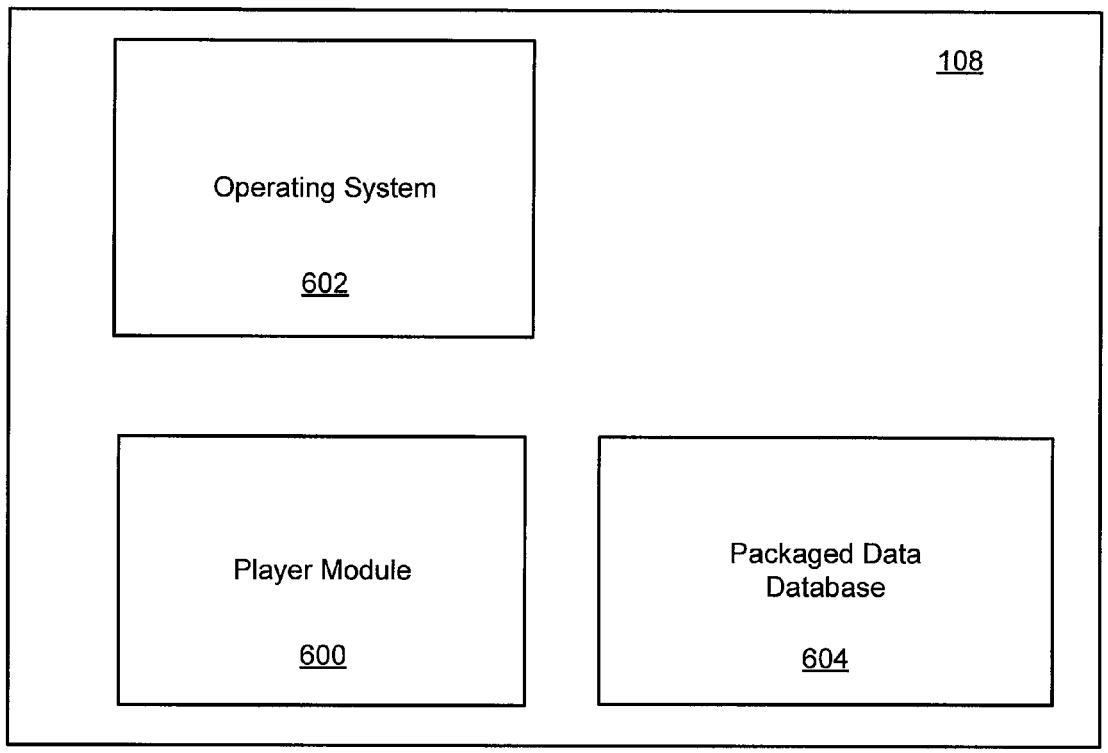
FIG. 6 is a block diagram illustrating components of an example embodiment of a system for requesting/receiving streaming data at a mobile device.

FIG. 6 is a block diagram illustrating modules that may be stored in flash memory 108 of mobile device 100. The modules include player module 600, operating system 602, and packaged data database 604. It will be understood that these modules may be computer program code or instructions that may be loaded into RAM 106 and executed by microprocessor 102 in mobile device 100 to cause microprocessor 102 to perform various functions. Further, software, such as player module 600, may be sent to mobile device 100 by wired or wireless connections.

Packaged data database 604 includes packaged data 512 that has been received from streaming data server 274. As described above, packaged data 512 may include both streaming data 506 and advertising data 508.

In addition to providing other general operating system functions, operating system 602 may also be responsible for communication with streaming data management server 276. As noted above, operating system 602 provides requests, commands and setting information to streaming data management server 276. For example, operating system 602 may receive a request from a user for streaming data and forward that request to streaming data management server 276. Once streaming data management server 276 has instructed streaming data server 274 to access and save the requested streaming data, and streaming data server 274 has sent the streaming data to mobile device 100 via packaged data 512, operating system 602 saves packaged data 512 into packaged data database 604. Once packaged data 512 has been saved, operating system 602 may notify the user of receipt of the packaged data 512 or may merely wait for the user to access the packaged data 512 via player module 600.

Player module 600 is configured to allow the user to access packaged data 512 that is available in packaged data database 604 and select particular packaged data for viewing. It will be understood that player module 600 and operating system 602 can be incorporated into one piece of software or can be separate pieces of software stored within flash memory 108. Player module 600 and the capabilities of mobile device 100 determine the type of content that can be sent to mobile device 100 from streaming data server 274. Mobile devices with a faster central processing unit (CPU) will be able to present and play richer content. In this context the term "richer" means larger in size and requires greater CPU and processing speed to present the content in a coherent form to the user. When the user wishes to actually see the content that has been previously streamed to the device, player module 600 is invoked to render the information for the user. This can involve different types of processing. For instance, this can involve MPEG3 processing for audio or video data, and/or MPEG4 processing for video and/or other codec standards such as AVI, DivX and the like and/or any combination of codec formats such as the combination of DivX and MPEG formats to produce DIV3 and DIV4 formats.

The current location of mobile device 100 is monitored by the operating system 602, and is sent to streaming data management server 276 by operating system 602 based on predetermined settings.

When system 500 is in operation, the mobile device user may select streaming data 506 from a particular information source 510, or may have previously specified a desire to receive all new streaming data 506 from a particular information source 510. Streaming data server 274 retrieves and reformats streaming data 506 to prepare packaged data 512 for sending to mobile device 100. Packaged data 512 arrives from streaming data server 274 and may be placed into a channel, or a channel may be created to accommodate packaged data 512. A list of channels or a list of streaming data is then updated and the updated list is presented to the user when the user accesses player module 600.

From time to time, the user executes player module 600 to view what streaming data has arrived. If streaming data arrives and the user is not currently using player module 600, then a notification might be activated to alert the user that new streaming data has been received by mobile device 100. Notifications may be vibrator-based, sound-based, flickering-LED type notifications, or some other type of suitable notification.

When the user accesses player module 600, player module 600 presents a list of streaming data that is available, possibly divided into channels or the like to allow easier selection of the streaming data to be accessed. Upon selection, player module 600 then presents related packaged data 512 to the user.

Figure 7:
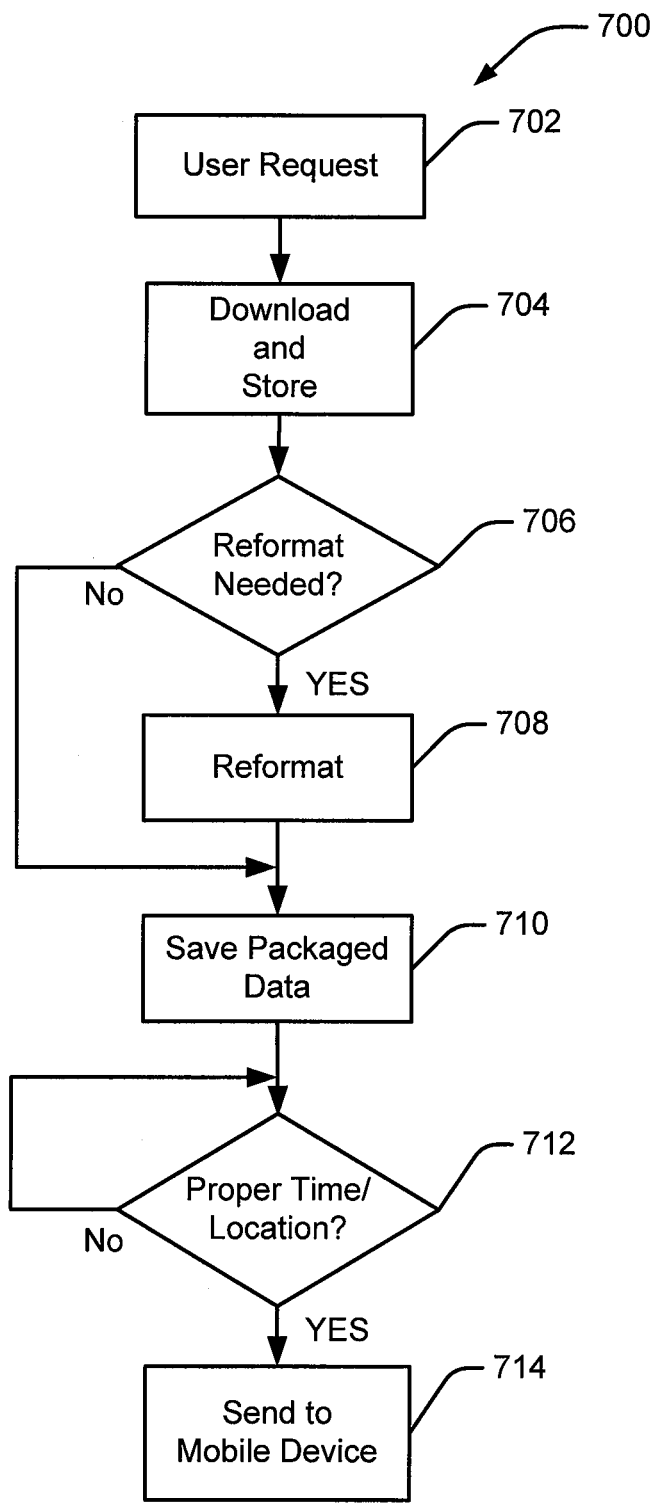
FIG. 7 is a flowchart showing an example embodiment of a general method for providing streaming data to a mobile device.

FIG. 7 is a flow chart of the general steps conducted by the system for providing streaming data. At 702, streaming data management server 276 receives a user request for streaming data 506. At 704, streaming data server 274 retrieves the requested streaming data 506 based on instructions from streaming data management server 276. In this process, streaming data server 274 may also retrieve advertising data 508 from ad server 504. In the process of retrieving requested streaming data 506 and advertising data 508, at step 706, streaming data server 274 considers whether reformatting is required for requested streaming data 506 and advertising data 508 prior to saving the data in a file (i.e. packaged data 512). Streaming data server 274 makes this determination based on instructions received from streaming data management server 276 which are in turn based on settings provided by the user of mobile device 100. If reformatting is required, this is performed at step 708. For example, the user of mobile device 100 may have requested that the streaming data be sent to mobile device 100 as only audio data, rather than audio and video data. Other formatting may also be done such as changing the aspect ratio, or reducing the information to fit video on a smaller display screen, and/or transcoding one codec to another codec for more efficient presentation on a slower mobile processor. Streaming data 506 and advertising data 508 may be combined during retrieval, during reformatting, after storing or remain separate while using tags or the like to combine during playback. At step 710, the streaming data, whether reformatted or not, is stored as packaged data 512. At step 712, system 500 then waits until the settings such as the proper time, location, status or the like are met before providing packaged data 512 to mobile device 100. As noted above, during use, streaming data management server 276 is receiving information about mobile device 100, including, for example, information about its location, status and the like. Once the parameters for the settings of time, location, status or the like are met, streaming data server 274 sends packaged data 512 to mobile device 100 at step 714.

Since the settings or variables, such as time, location status, can be set by the user with regards to when packaged data 512 should be sent to mobile device 100, the user can avoid sending larger quantities of data at times or locations where the data communication fees may be higher or when the user would like to maintain bandwidth for other applications or the like. For example, the user of mobile device 100 may only wish to receive packaged data 512 during off-peak hours and during times when mobile device 100 is within a local transmission range rather than a long distance or roaming range with regard to data transmissions.

Figure 8:
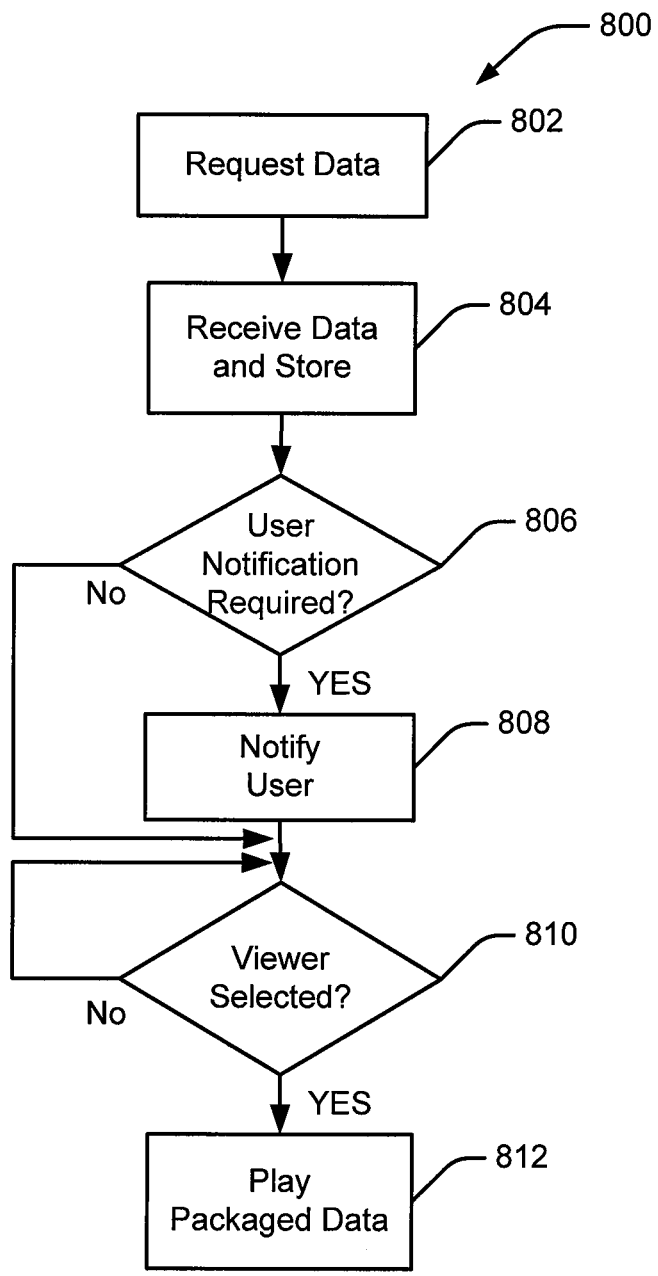
FIG. 8 is a flowchart showing an example embodiment of a general method for requesting/receiving streaming data at a mobile device.

FIG. 8 is a flowchart showing a process 800 for the operation of operating system 602 and player module 600 on mobile device 100 when requesting streaming data. At step 802, operating system 602 first receives a request from a user for streaming data. This request may be received, for example, by intercepting the user's click on an http address that relates to streaming data or by various other methods as will be understood by one of skill in the art. Operating system 602 may prompt the user to indicate if the requested streaming data is needed immediately or later or may act on configuration settings to automatically delay the receipt of the requested streaming data, for example if the current time of the request is one in which there is a high data rate on the networks. Operating system 602 then sends the user request to streaming data management server 276 and may also include instructions or settings with regard to variables such as the time, the location, or other variables relating to when the requested streaming data should be sent to mobile device 100. Alternatively, operating system 602 may maintain preset configuration information with regard to how the user of mobile device 100 wishes to receive the requested streaming data. This preset configuration information may be sent by operating system 602 to streaming data management server 276 with each request or may be sent once and then stored on streaming data management server 276 until changed by the user of mobile device 100. At step 804, operating system 602 waits to receive packaged data corresponding to the requested streaming data from streaming data server 274 and then stores the packaged data in packaged data database 604. At step 806, operating system 602 determines if notification to the user is required. If so, the user is notified at step 808. If not, operating system 602 skips the user notification step 808 and moves to step 810 where operating system 602 waits until player module 600 or another suitable viewer is selected by the user. At step 812, player module 600 provides the user with a list of available packaged data 512 currently received and/or stored at mobile device 100 and allows the user to select and play a desired packaged data. Prior to step 810, operating system 602 can provide player module 600 with an updated list of packaged data that are available for viewing or listening depending on the data format of the available packaged data.

In some embodiments, player module 600 may be configured to automatically delete packaged data after viewing or listening, depending on the format, by the user or may prompt the user as to whether to delete the packaged data following viewing or listening.

It should be noted that the methods described herein can be adapted for any device that is capable of communication with a server to request streaming data in accordance with the principles specified herein. In this case, the device can be connected to the server via a hard-wired network connection, such as, but not limited to, LAN connections as shown in FIG. 4 for example or hard-wired modem connections, in which case the device can specify a time range and/or various formats for receiving requested streaming multimedia and/or advertising data. Accordingly, the communication subsystem is a network card, a cable modem, a phone modem and the like instead of a wireless radio and the like in the case of mobile device 100.

In one aspect, at least one embodiment described herein provides a method of providing streaming data to a mobile device. The method comprises receiving a request for streaming data from the mobile device; receiving settings with regards to the delivery of the streaming data to the mobile device; retrieving the streaming data from a source of the streaming data; reformatting the streaming data for the mobile device according to the settings; and sending the reformatted streaming data to the mobile device in accordance with the settings.

The settings can comprise a setting indicating that updates to the streaming data be retrieved in which case the step of retrieving the streaming data further comprises polling, at a first predetermined interval, the source of the streaming data to determine if the streaming data has been updated; and if the streaming data has been updated, retrieving updated streaming data.

The first predetermined interval is set according to the settings.

The settings can comprise a time range setting in which case the step of sending the reformatted streaming data comprises sending the reformatted streaming data to the mobile device at approximately the time range specified in the settings.

The time range setting can be specified for off-peak data transmission times and/or times associated with lower billing rates.

The settings can comprise a location range setting in which case the step of sending the reformatted streaming data comprises sending the reformatted streaming data to the mobile device when the mobile device is approximately at the location range specified in the settings.

The step of reformatting can comprise reformatting the streaming data into a single file.

The step of reformatting can comprise reformatting the streaming data into audio data.

In another aspect, at least one embodiment described herein provides a computer readable medium comprising computer readable instructions which, when executed by a computing device, cause the computing device to perform the steps of any of the methods outlined herein.

In yet another aspect, at least one embodiment described herein provides a server for obtaining and providing streaming data to a mobile device. The server comprises a communication interface being adapted to allow the server to communicate with a network; a data store; and a processor coupled to the communication interface and the data store to control the operation of the server. The server is configured to retrieve the streaming data from a streaming data source based on a request for the streaming data from the mobile device, store the requested streaming data in the data store, and in accordance with settings in the request, reformat the retrieved streaming data and send the reformatted retrieved streaming data to the mobile device.

The settings can comprise a time range setting in which case the server is configured to send the reformatted retrieved streaming data to the mobile device at approximately the time range specified in the settings.

The time range setting can be specified for off-peak data transmission times and/or times associated with lower billing rates.

The settings can comprise a location range setting in which case the server is configured to send the reformatted retrieved streaming data to the mobile device when the mobile device is approximately at the location range specified in the settings.

The server can be configured to reformat the retrieved streaming data into a single file and/or reformat the retrieved streaming data into audio data.

In yet another aspect, at least one embodiment described herein provides a device configured to request streaming data from a server. The device comprises: a main processor configured to control the operation of the mobile communication device; a communication subsystem connected to the main processor and configured to send and receive data; an operating system configured to receive a request for streaming data and provide the request for streaming data to the server, wherein the request comprises settings related to reformatting the streaming data and delivering the requested streaming data to the mobile device.

The operating system can include a time range setting in the request to instruct the server to send the requested streaming data to the device at approximately the time range specified in the settings.

The time range setting can be specified for off-peak data transmission times and/or times associated with lower billing rates.

The device can be a mobile device in which case the operating system is configured to include a location range setting in the request to instruct the server to send the requested streaming data to the mobile device when the mobile device is approximately at the location range specified in the settings.

The operating system can be configured to instruct the server to reformat the streaming data into a single file.

The operating system can be configured to instruct the server to reformat the streaming data into audio data.

It will be understood that the systems and methods described herein may be embodied in software, for example, on a physical computer readable medium or the like, or hardware or some combination thereof. It should also be understood that various modifications can be made to the example embodiments described and illustrated herein, without departing from the general scope of the appended claims.

We claim:

1. A method of providing streaming data from a source of the streaming data to a mobile device, the method comprising:
    at least one server receiving, from the mobile device, a request for the streaming data, the request comprising:
        format settings related to reformatting the streaming data, and
        transmission settings for controlling sending of reformatted streaming data that is formatted according to the format settings;
    the at least one server retrieving the streaming data from the source of the streaming data;
    the at least one server reformatting the retrieved streaming data for the mobile device according to the format settings received within the request from the mobile device; and
    the at least one server sending the reformatted streaming data to the mobile device in accordance with the transmission settings received within the request from the mobile device.

2. The method of claim 1, wherein updates to the streaming data are to be retrieved and the retrieving the streaming data further comprises:
    polling, at a first predetermined interval, the source of the streaming data to determine if the streaming data has been updated; and
    if the streaming data has been updated, retrieving updated streaming data.

3. The method of claim 2, wherein the first predetermined interval is set according to the settings.

4. The method of claim 1, wherein the transmission settings comprise a time range setting and the at least one server sending the reformatted streaming data comprises sending the reformatted streaming data to the mobile device at approximately the time range specified in the settings.

5. The method of claim 4, wherein the time range setting is specified for at least one of off-peak data transmission times or times associated with lower billing rates.

6. The method of claim 1, wherein the transmission settings comprise a location range setting and the at least one server sending the reformatted streaming data comprises sending the reformatted streaming data to the mobile device when the mobile device is approximately at the location range specified in the settings.

7. The method of claim 1, wherein the at least one server reformatting comprises reformatting the retrieved streaming data into a single file.

8. The method of claim 1, wherein the at least one server reformatting comprises reformatting the retrieved streaming data into audio data.

9. The method of claim 1, further comprising storing the reformatted streamed data.

10. A non-transitory computer readable medium comprising computer readable instructions which, when executed by a computing device, cause at least one server to:
    receive a request for streaming data, wherein the request is received from a mobile device and the request comprises:
        format settings related to reformatting the streaming data, and
        transmission settings for controlling sending of reformatted streaming data that is formatted according to the format settings;
    retrieve the streaming data from a source of the streaming data;
    reformat the retrieved streaming data for the mobile device according to the format settings received within the request from the mobile device; and
    send the reformatted streaming data to the mobile device in accordance with the transmission settings received within the request from the mobile device.

11. A server for obtaining and providing streaming data to a mobile device, wherein the server comprises:
    a communication interface being adapted to allow the server to communicate with a network;
    a data store; and a processor coupled to the communication interface and the data store to control the operation of the server, wherein the server is configured to:
retrieve the streaming data from a streaming data source based on a request for the streaming data, wherein the request is received from the mobile device and the request comprises:
format settings related to reformatting the streaming data and
transmission settings for controlling sending of reformatted streaming data that is formatted according to the format settings,
store the requested streaming data in the data store, and
in accordance with the format settings received within the request, reformat the retrieved streaming data, and
in accordance with the transmission settings received within the request, send the reformatted retrieved streaming data to the mobile device.

12. The server of claim 11, wherein the transmission settings comprise a time range setting and the server is configured to send the reformatted retrieved streaming data to the mobile device at approximately the time range specified in the settings.

13. The server of claim 12, wherein the time range setting is specified for at least one of off-peak data transmission times or times associated with lower billing rates.

14. The server of claim 11, wherein the transmission settings comprise a location range setting and the server is configured to send the reformatted retrieved streaming data to the mobile device when the mobile device is approximately at the location range specified in the settings.

15. The server of claim 11, wherein the server is configured to reformat the retrieved streaming data into at least one of a single file or audio data.

16. A device configured to request streaming data from a server, wherein the device comprises:
a main processor configured to control the operation of the device;
a communication subsystem connected to the main processor and configured to send and receive data;
an operating system configured to:
receive a request for streaming data,
send the request for streaming data to the server, wherein the request comprises:
format settings related to reformatting the streaming data and
transmission settings for controlling sending of reformatted streaming data that is formatted according to the format settings, and
receive the requested streaming data at the device in accordance with the transmission settings sent in the request, wherein the received streaming data is reformatted in accordance with the format settings sent in the request.

17. The device of claim 16, wherein the operating system includes a time range setting in the transmission settings to instruct the server to send the requested streaming data to the device at approximately the time range.

18. The device of claim 17, wherein the time range setting is specified for at least one of off-peak data transmission times or times associated with lower billing rates.

19. The device of claim 16, wherein the device is a mobile device and the operating system is configured to include a location range setting in the transmission settings to instruct the server to send the requested streaming data to the mobile device when the mobile device is approximately at the location range.

20. The device of claim 16, wherein the operating system is configured to instruct the server to reformat the requested streaming data into a single file.

21. The device of claim 16, wherein the operating system is configured to instruct the server to reformat the requested streaming data into audio data.

* * * * *